and sometimes to make the colored portions of different densities as disclosed in my Patent No. 1,067,793, July 22, 1913. In order to prevent any deposit of the coloring pigments upon the clear portion, this portion is covered by a pattern of suitable form. The pattern is designed to fit close to the glass surface so that none of the pigments wil be blown onto the glass beneath the pattern. Preferably a strong light is placed back of the glass under treatment so that the operator may at all times observe the effect of the following pigment-depositing step.

UNITED STATES PATENT OFFICE.

JOHN U. BARR, OF NEW YORK, N. Y.

PROCESS OF PREPARING COLORED GOGGLES.

1,206,291.  Specification of Letters Patent.  Patented Nov. 28, 1916.

No Drawing.  Application filed August 11, 1915. Serial No. 44,947.

*To all whom it may concern:*

Be it known that I, JOHN U. BARR, a citizen of the United States, and a resident of the city of New York, county of New York, and State of New York, have invented certain new and useful Improvements in Processes for Preparing Colored Goggles, of which the following is a specification.

My invention relates to an improvement in the art of preparing one-piece transparent goggle glasses and lenses having portions thereof with different degrees of colored transparency.

The manufacture of colored automobile goggles has heretofore been attained with much difficulty for it has been practically impossible to coat these glasses economically without showing streaks, cloudy effects on some portions thereof, and even the micromistic specks of the coating material become unpleasant and develop an eye fatigue after goggles equipped with such glasses have been worn for awhile. Defects in the uniformity of coating which when viewed by reflected light are not at all apparent, become quite disagreeable when viewed by means of strong transmitted light, such as the sun passing through the colored glass to the wearer's eyes.

One of the objects of my invention is to produce economically a clear transparent coated glass for use as a goggle glass which will be free of the above suggested objections and portions of which will be as clear of clouds and other defects as if this coated portion were constructed of glass with the coloring matter chemically combined therewith. I attain this object broadly by forcibly depositing a film of pigment on the glass with the pigment element of the depositing stream so finely divided and diluted by the air present as to lose its character as solid matter, simultaneously subjecting the glass to the action of a strong air current at room temperature and finally fixing the film of pigments by a burning process.

Glass, which may be amber, blue or colorless stock usually used in goggles is first cut to shape. One side of the shaped glass is cleaned, preferably with alcohol, to free the same from grease, acid and other stains. It is essential to the success of the process that the glass be entirely free of any foreign matter. It is usual to make one portion of the glass clear and to make other portions col- The glass to be coated is held in front of the operator and transversely of a strong current of air which subjects the glass to a rapid air drying operation during the deposit of pigment. This action may be advantageously attained by the operator working at the mouth of a horizontally disposed hood in which the air is drawn by a fan. This has the additional advantage, if not necessity, of drawing the spray hereinafter described away from the operator and in a direction to deposit the same on the glass.

Starting from one side of the surface to be treated the operator directs a blast of extremely attenuated colored liquid pigment uniformly across the face of the glass. It is of the utmost importance that the pigments be finely divided so fine in fact that the best results are attained only when the particles are practically invisible and blown directly on the glass at relatively high velocity. The pigment is preferably any of the fine ground metallic colors usually employed in such process, thinned out to a consistency about that of thin milk and strained to remove any lumps, however, small. The depositing step is best attained by means of an air brush or rather fine type of atomizer, the nozzle of which is provided with an extremely fine needle controlled outlet. This outlet should be a pin hole type and the best results can only be attained with a fine outlet, the finer the better. It is also of importance that the force of this air blast be such as to cause the film of the glass to dry rapidly, if not instantaneously, but the force must be less than the force which would prevent the film of pigment from adhering to the glass surface. It has been found in practice that the best results are attained with such an instrument when the automizing air pressure on the brush is well over five pounds and preferably less than twenty-five pounds.

The effect on the glass will be as if a light dew were deposited thereon to slightly change the color of the transmitted light and to gradually increase the density of the glass at this point. There is formed a flat cloud which gradually assumes the character of a coating. The air brush is waved back and forth across the surface, the operator pausing over the portion of least density of film until all portions of the glass are of uniform density, which can readily be observed as the operator is looking through the glass during the entire operation. Due to the finely divided character of the pigments, the operation is relatively slow but this permits the operator to study the light density character of the film deposited. As but relatively small amounts of pigments are deposited per unit of time, any undue hesitancy on the part of the operator at a portion of the glass will not have any material effect upon the film. During this relatively slow deposit of the pigments a relatively large amount of air is carried to the glass, which apparently has the effect of laying the pigments in a substantially smooth-top layer and at the same time exerts a rapid drying effect upon the film. This rapid air drying from both the passage of the air current and also from the atomizing action of the air brush has the effect of setting the colors and there is no tendency to flow or to form dots, and, as a matter of fact, there is not even formed the blotted appearance characterizing the usual air brush painting operation.

In the commercial form of glasses this operation is continued until the deposit is from, approximately five ten-thousandths to three one-thousandths of an inch in thickness, depending upon the desired density to be given the colored parts. Should it be desired to more deeply color some parts of the colored surface suitable patterns are imposed over the previously colored portions and the uncovered portion subjected to a continuation of this treatment, or, if desired, a different color of pigment may be used as would probably be the case where decorating effect is desired, as with automobile head light glasses.

When the desired effect has been produced the patterns are removed and by means of a pointed instrument the line of demarcation is cut should this line be ragged for any reason. The filmed glass is then immersed in a plaster coating, such as powdered chalk or plaster-of-Paris, and then burned in a furnace as is usual with color fixing processes practised in the crockery decorative art. When cooled the clay is washed off and the glass is ready to be mounted in its frame.

Should the burning operation be continued too long, it may be necessary, in order to save some of the glass, to polish the same after the clay has been removed but this last step is usually not necessary.

By means of this process there is formed a one-piece transparent glass differently colored in different portions and in which the different colored portions have a clear and uniform transparency and which can be used as goggle or lens glasses without any discomfort to the wearer. The glasses so treated are free from fine specks, are absolutely uniform in color even by transmitted light and are free from streaks and other blemishes. By means of this process it is possible to take any prescription glass as turned out by the refractionist and color the same in accordance with the prescription. Glasses so treated resemble glasses in which the coloring matter is chemically embodied in the glass batch before it is rolled and polished.

Commercially this process is of the greatest economic importance as it is comparatively inexpensive and is continuously under the control of the operator who can very quickly develop a high degree of efficiency in determining the exact amount of film to deposit on any one portion to bring this portion up to the density of the surrounding portion.

While the process may be of value in other arts where refinement of work is essential, it finds its particular adaptability to the goggle and lens manufacture due to the requirement of uniformly clear and transparently colored portions of different colors free from blemish which has an unpleasant effect upon the eyes of the users.

Glasses painted in the usual meaning of this term, such as by dipping and draining, by brushing or by the indiscriminate precipitation of a cloud of pigments thereon, are so defective in uniformity of covering as to be practically valueless for use as eye pieces.

Having thus described my invention, I claim:

1. The process of producing clear transparent colored goggle glasses and the like, which consists in uniformly coating the surface of the glass with pigment in a finely atomized condition and utilizing the transparency of the glass to determine the degree of density of such coating, and simultaneously drying the coating with an independent current of air, and finally fixing the dried pigment coating.

2. The process of producing clear transparent colored goggle glasses and the like, which consists in uniformly coating the surface of the glass with pigment in a finely atomized condition and utilizing the transparency of the glass to determine the degree of density of such coating, and simultaneously delivering independently, air to the surface of the glass in relatively larger volume per unit of time than the atomized pigment to rapidly dry the pigment coating, and finally fixing the coating.

3. The method of making transparent colored goggle glasses which consists in repeatedly spraying a finely atomized pigment uniformly over the surface of the glass by the action of an excess of air pressure, and finally fixing the deposited pigment by subjecting the glass to heat.

4. The method of making transparent colored goggle glasses which consists in repeatedly spraying a finely atomized pigment uniformly over the entire surface of the glass by the action of an excess of air pressure, then uniformly increasing the density of the pigment deposited upon a defined portion of the surface of the glass, and finally fixing the deposited pigment by heat.

Signed at New York city, in the county of New York and State of New York, this 9th day of August, A. D. 1915.

JOHN U. BARR.